United States Patent

Coontz

[15] 3,700,045
[45] Oct. 24, 1972

[54] TRACTOR-MOUNTED POST HOLE DIGGER

[72] Inventor: John G. Coontz, P.O. Box 104, Kiowa, Kans. 67070

[22] Filed: April 26, 1971

[21] Appl. No.: 137,237

[52] U.S. Cl. .................... 173/26, 173/41, 175/162
[51] Int. Cl. ............................................ E21c 11/02
[58] Field of Search........ 175/27, 122, 162, 170, 203, 175/220; 173/26, 38, 40, 41, 160

[56] References Cited

UNITED STATES PATENTS

| 2,474,981 | 7/1949 | McCardell | 173/26 X |
| 2,480,537 | 8/1949 | Arps et al. | 173/26 |
| 2,490,471 | 12/1949 | Ragoss | 173/26 X |
| 2,509,410 | 5/1950 | Applegate | 173/26 |
| 2,514,832 | 7/1950 | Benson | 173/26 |
| 2,521,895 | 9/1950 | Bunting | 175/170 X |
| 2,639,892 | 5/1953 | Jones | 173/26 X |
| 2,939,682 | 6/1960 | Kromberg | 173/26 |

Primary Examiner—David H. Brown
Attorney—John H. Widdowson

[57] ABSTRACT

A tractor-mountable post hole digger has a special frame mountable on the hitch of a tractor, an auger specially mounted with the frame to be moved vertically relative the frame and rotated by the powering means of the tractor.

6 Claims, 6 Drawing Figures

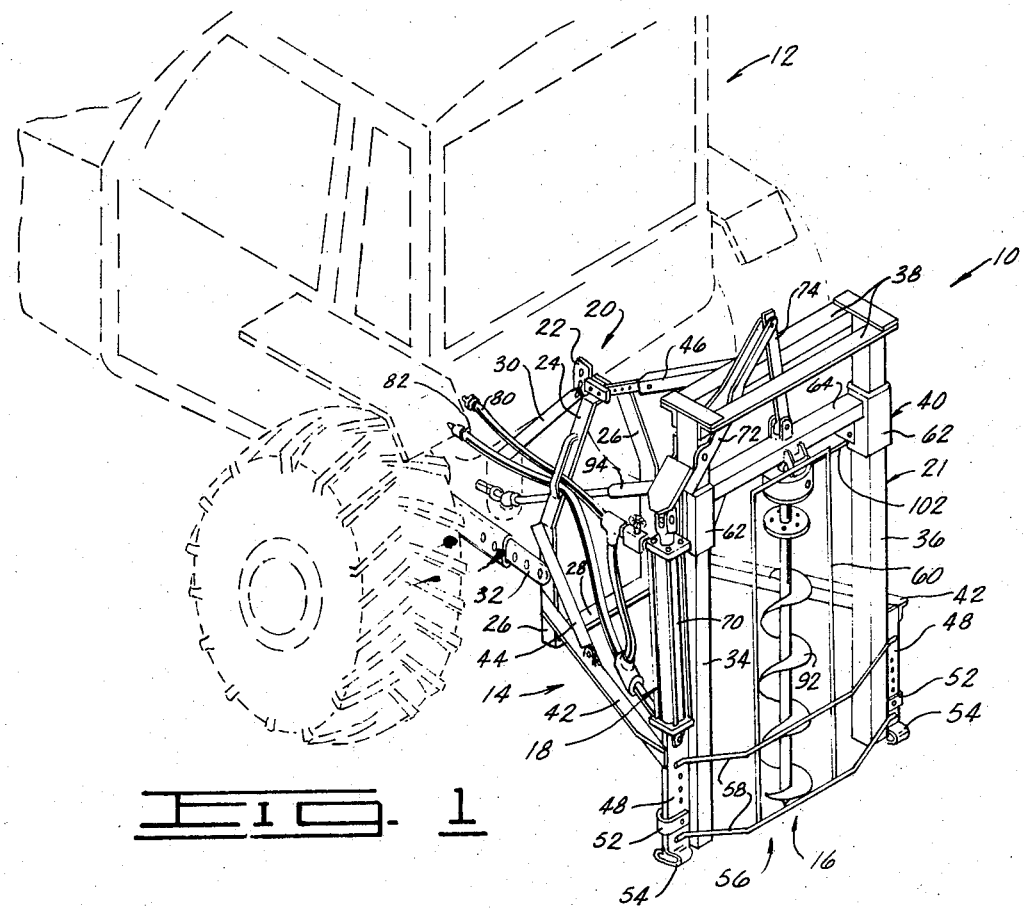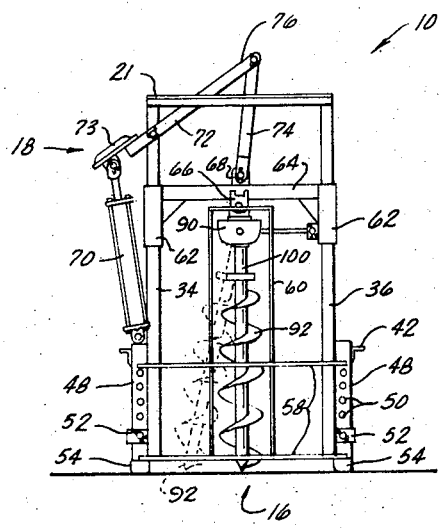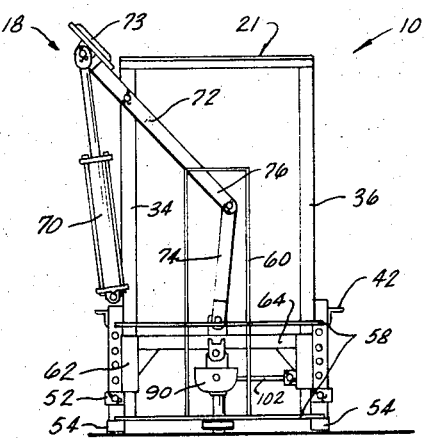
INVENTOR
JOHN G. COONTZ
BY John H. Widdinoon
ATTORNEY

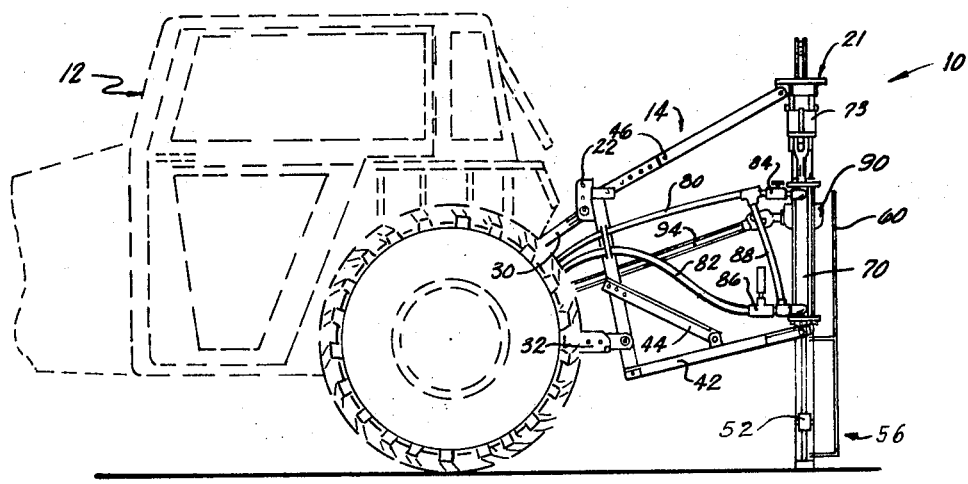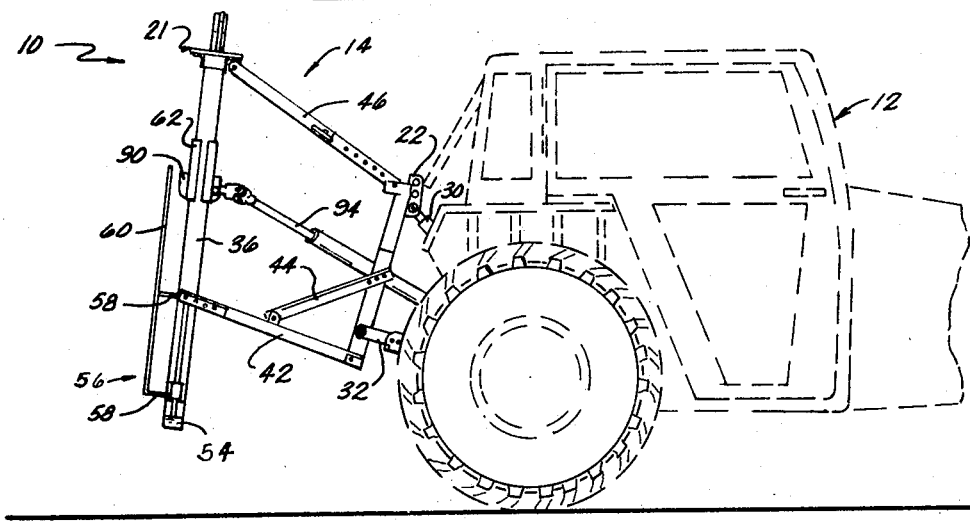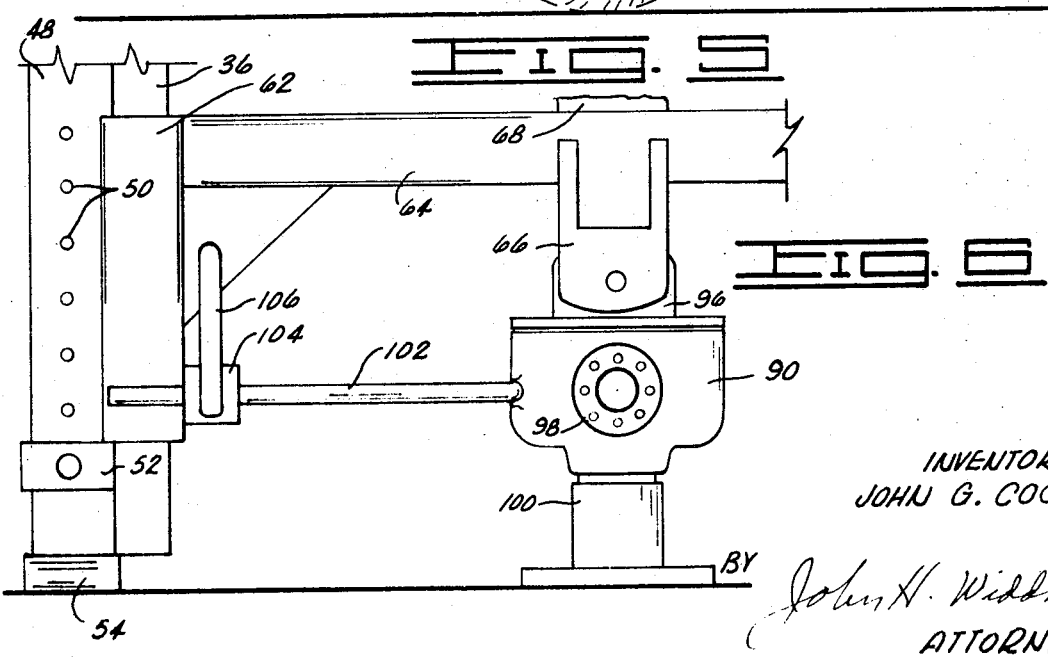

TRACTOR-MOUNTED POST HOLE DIGGER

Numerous types of post hole diggers, foundation hole drillers and the like are known in the prior art. However, these prior art devices are not adapted for use with a tractor having a rear three point hitch and do not have a means to operate easily on an uneven terrain. These prior art devices do not have a means to forcefully push the auger screw into the ground without using only the weight of the auger screw and drive assembly. The prior art devices generally do not have any provision for removing the auger screw from the earth should it become stuck or hit an obstruction that might damage it.

In one preferred specific embodiment of this invention a tractor-mounted post hole digger is provided having a frame mountable with the hitch of a tractor and having an auger mounted on the frame to be moved up and down. The frame includes a mount to be coupled with a three point hitch of a tractor and a pair of elongated upright members with a vertically movable transverse member therebetween. The auger is mounted on the vertically movable transverse member of the frame and the auger is mounted so as to be pivoted and held in position. The auger is moved vertically by a hydraulic cylinder and lever apparatus attached to the frame and operable from the tractor. The auger has a gearbox assembly to rotate the auger bit which is connectable to power take-off of a tractor. The hydraulic cylinder and lever apparatus is used to apply downward force to the auger to aid in the digging operation and has a control valve to provide vertical speed control of the auger. The hydraulic cylinder apparatus has a pressure relief valve to provide for safety and protection of the machine by stopping the vertical motion of the auger should it become stuck or have its vertical motion stopped or substantially slowed so that pressure from the hydraulic cylinder might damage the auger screw or cause other damage. The pressure relief valve is used in conjunction with a flow control valve which regulates the auger's vertical speed.

One object of this invention is to provide a tractor-mounted post hole digger overcoming the aforementioned disadvantages of the prior art devices.

Still, one other object of this invention is to provide a tractor-mounted post hole digger having a frame attachable to the three point hitch of a tractor and to support the auger.

Still another object of this invention is to provide a tractor-mounted post hole digger having an auger that has a hydraulic cylinder and apparatus to force the auger downward while digging and to raise the auger after digging.

Yet another object of this invention is to provide a tractor-mounted post hole digger having a valve apparatus connected to the auger moving hydraulic cylinder to regulate the rate of movement thereof and to relieve the hydraulic pressure on the cylinder should the motion of the auger be stopped or substantially slowed.

Yet another object of this invention is to provide a tractor-mounted post hole digger having an auger with an auger screw mounted to be rotated by a gearbox drivable by the power take-off of a tractor and pivotable relative to the supporting frame structure.

Various other objects, advantages, and features of the invention will become apparent to those skilled in the art from the following discussion, taken in conjunction with the accompanying drawings, in which:

FIG. 1 is a perspective view of the rear of a tractor and the post hole digger taken from above showing the tractor in dashed lines and partially removed and the post hole digger in a raised position;

FIG. 2 is a rear elevation view of the post hole digger in a partially down position with the auger shown in vertical position in solid lines and in a transversely tilted position in dashed lines;

FIG. 3 is a rear elevation view of the post hole digger in the fully down position;

FIG. 4 is a side elevation view of the post hole digger mounted on a tractor, shown in dashed lines, with the auger shown in a raised position;

FIG. 5 is a side elevation view of the post hole digger mounted on a tractor, shown in dashed lines, with the post hole digger in the raised position so as to be transported; and FIG. 6 is an enlarged segmental front elevation view of the auger drive head, transverse auger mount member, upright frame member and auger positioning rod with the auger in the fully down position.

The following is a discussion and description of preferred specific embodiments of the tractor-mounted post hole digger of this invention, such being made with reference to the drawings whereupon the same reference numerals are used to indicate the same or similar parts and/or structure. It is to be understood that such discussion and description is not to unduly limit the scope of the invention.

Referring to the drawings in detail and in particular to FIG. 1, a tractor-mounted post hole digger of this invention, generally indicated at 10, is shown in perspective mounted on a tractor, generally indicated at 12. The post hole digger 10 includes a frame assembly 14 mountable with the tractor 12 having an auger 16 moved up and down by a hydraulic cylinder and attached lever assembly, generally indicated at 18.

The frame assembly 14 includes a mount 20 and an upright auger frame 21 connected by transverse frame members. The mount 20 has an upper coupling 22 on a top member 24, upright side members 26 and a bottom member 28. The upper coupling 22 is preferably attached to the lifting member 30 of the tractor hitch. The side mount members 26 are preferably attached to the supporting tractor hitch members 32 as can be seen in the drawings. The upright auger frame 21 has a pair of elongated upright members 34 and 36 joined at the top by transverse members 38 having a vertically movable transverse member 40 between the upright members 34 and 36 and supported in a generally upright position from the mount 20 by the transverse frame members. The transverse frame members are pivotally attached to the mount 20 and the auger frame 21 and include a pair of lower fixed length members 42 connected between the mount sides 26 and the upright auger frame members 36, a pair of adjustable length lower members 44 between the mount 20 and the other lower members 42 and a length adjustable upper member 46 between the mount 20 and the transverse auger frame top members 38. All the transverse frame members are provided with pinned ends and joints so the adjustable members 44 and 46 can be changed in length thereby changing the upright angular position of the auger frame 21. The adjustable members 44 and 46 are preferably constructed in two segments joined by a pin or the like and having a plurality of spaced holes so the overall dimension of the members can be changed. The adjustment of these members has been found advantageous to change the vertical angle of the auger frame 21 as may be desired in use and it has been found advantageous in adapting the post hole digger 10 to different makes and types of tractors which do not have the same size and type of hitch. Additionally, this adjustment can be used to vary the angular position of the auger for digging angular holes.

The upright members 34 and 36 of the auger frame 21 are preferably rectangularly shaped as can be seen in the drawings and have flange members 48 extending from the lower portion on the outside thereof. The flanges 48 have a plurality of holes 50 therein used to attach stop members 52 which are used to limit the downward movement of the auger 14. A loop portion 54 attached to the flanges 48 extends below the bottom of the upright auger frame members 34 and 36 and provides resting points for the auger frame 21 to contact the ground. An auger alignment guide and fence pusher is attached to the flanges 48 as generally indicated at 56. The alignment guide and fence pusher 56 has a pair of support members 58 joining the flanges 48 and on the rear side of the auger frame 21 and extending rearward past the auger 16. A rectangular guide member 60 extends upward from the support members 58 preferably in the shape shown in the drawings.

The movable transverse member 40 has rectangular end portions 62 integrally attached to the transverse connecting member 64. The end portions 62 are wrapped around the rectangular upright members 34 and 36 on three sides and partially on the outer sides so as to allow the end portions to pass adjacent to the flanges 48. The end portions 62 can be best seen in FIG. 1, and they are shown in position adjacent the flanges 48 in FIGS. 3 and 6. The end portions 62 are adapted to move up and down the upright members 34 and 36 in sliding contact with them. The transverse connecting member 64 has a flange 66 on the lower side to attach the auger 14 and another flange 68 on the upper side to attach the hydraulic cylinder and lever assembly 18.

The hydraulic cylinder and lever assembly 18 includes a hydraulic cylinder 70, a fulcrum 72 and a connecting rod 74, with conduits and valves connecting the hydraulic cylinder 70 to the tractor 12. The hydraulic cylinder 70 is pivotally mounted at the head end on the upper end of a flange 48 on the upright auger frame member 34 and has the outer end of the piston pivotally attached to the fulcrum 72. The fulcrum 72 is pivotally mounted on the upright auger frame member 34 and has a short portion on the outer end 73 pivotally connected to the hydraulic cylinder piston and a longer other end portion 76 extending inside the auger frame 21 pivotally attached to the upper end of the connecting rod 74. The connecting rod 74 is attached to the inside end 76 of the fulcrum 72 and to the top flange 68 on the transverse connecting member 64. The connecting rod 74 links the fulcrum 72 to the transverse movable member 40 so as to move it up and down the upright frame members 36. It is to be noted the fulcrum 72 is mounted below the transverse top members 38 of the auger frame 21 and when the auger 16 is lifted the longer fulcrum end 76 passes between the two top members 38.

The hydraulic cylinder 70 is connected to the hydraulics of the tractor 12 by two lines 80 and 82. Also the hydraulic cylinder 70 is connected to flow control valve 84 on the piston end of the cylinder and a pressure relief valve 86 on the head end of the cylinder. The flow control valve 84 is used to regulate the flow of hydraulic fluid through the hydraulic cylinder 70 thereby regulating the vertical rate of travel of the transverse member 40 and more importantly the vertical movement of the auger 16. It is to be understood the flow control valve 84 is adjustable in order to provide a variable vertical rate of travel of the auger 16. The vertical speed of the auger 16 depends on the density of the earth in which the hole is being dug and is easily regulated to obtain an optimum speed by adjustment of the flow control valve 84. The pressure relief valve 86 has a pressure relief line 88 connecting it to the other hydraulic line 80. Should the auger become stopped in its downward vertical motion, the pressure in the hydraulic cylinder rises; when that pressure reaches a predetermined level, the pressure relief valve 86 opens and dumps hydraulic fluid from the then high pressure line 82 into the low pressure or return line 80. This causes the hydraulic fluid to bypass the cylinder 70, thereby preventing possible damage to it or auger 16. It is to be noted the pressure relief valve 86 is adjustable so as to provide a variable degree of protection for the post hole digger 10. Adjustment of the pressure relief valve 86 will necessarily depend on the particular auger bit used, the earth density and other factors that control structural limitations of the post hole digger.

The auger 16 has a right angle gearbox 90 connected to the auger bit 92 and the drive shaft 94. The gearbox 90 has a top mount 96 so it can be connected to the flange 66 on the transverse connecting member 64 so as to be pivoted perpendicular to the longitudinal axis of the tractor 12. The driveshaft 94 is attached to the gearbox at the input flange 98 on the forward side thereof. The driveshaft 94 has two segments connected by a splined joint so it will adjust in length as the post hole digger is raised and lowered; it is also coupled with universal joints to the power take-off shaft of the tractor as can be seen in FIG. 1. The auger bit 92 is mounted on a shaft and flange 100 extending downward from the gearbox 90. The auger bit 92 is preferably mounted with the shaft and flange 100 so it can be easily removed if necessary for replacement or repair.

The gearbox 90 and supporting structure is shown in detail in FIG. 6. A positioning rod 102 is pivotally mounted on one side of the gearbox 90 and extends horizontally through a clamp block 104 that has a screw lock 106 to hold the rod 102 in a fixed position. The positioning rod 102 is used to hold the auger 16 in a fixed transverse angular position either vertically or at an angle. The positioning rod extends through the clamp block 104 and is held in place by the screw lock 106. The auger 16 is positionable at an angle for convenience in drilling vertical holes when the tractor is on uneven ground or for use when an angular hole is desired and the tractor is on level ground. The auger 16 is shown in a vertical position in FIG. 2 by the solid lines and in an angular position by the dashed lines. As can be seen in FIG. 6 the positioning rod 102 is sufficiently long so the auger 16 can be positioned on either side of the auger frame 21.

With the post hole digger 10 of this invention mounted on a tractor as shown in the drawings it can be raised and transported from place to place for use. FIG. 5 shows the post hole digger auger frame 21 in the raised position as it would be transported. When transported the auger 16 should be raised sufficiently to prevent damage to the auger bit 92. In order to use the post hole digger 10, the auger position with the looped ends 54 on the ground is positioned so the auger bit 92 is in position to drill the hole in the desired place. The depth of the hole to be drilled is controllable by the stops 52 mounted on the flanges 48 of the auger frame 21. The stops 52 contact the ends 62 of the vertically movable transverse member 64 and limit the downward movement of the auger 16. The stops 52 are V-shaped members held in place on the flanges 48 by pins through the holes 48. The stops 52 can be easily moved to different holes to adjust the depth of hole that will be drilled. The stops 52 have been found very useful where a number of holes the same depth are to be drilled and a uniform depth is required.

With the post hole digger 10 in place the auger bit 92 is rotated by the power take-off of the tractor 12 through the driveshaft 94. The vertical motion of the auger 16 is controlled from the hydraulic system of the tractor which is normally used for other hydraulically operated attachments.

The requirement for operating the hydraulic cylinder 70 is a two way valve and other conventional hydraulic system components connected to the hydraulic lines 80 and 82 adapted to supply fluid at high pressure into one of the lines and return fluid at low pressure from the other line to the reservoir in order to move the hydraulic cylinder 70 in one direction and reverse the direction of flow to move the hydraulic cylinder 70 in the opposite direction. As hydraulic fluid flows into the head end of the cylinder 70 through line 82, fluid simultaneously flows out of the piston end of the cylinder 70 through the flow control valve 84 and line 80; this moves the piston from the hydraulic cylinder 70, rotates the fulcrum 72 and moves the transverse member 64 and the auger 16 downward. The rate of motion of the hydraulic cylinder 70 is controlled by restricting fluid flow from the cylinder 70 by the flow control valve 84. The flow control valve 84 has a variable size orifice in it which restricts fluid flow through the valve. The rate of fluid flow through the valve 84 can be adjusted which in turn changes the speed of the piston and the vertical speed of the auger 16. In operation hydraulic fluid is introduced into the system in an unrestricted amount and the flow control valve 84 controls the rate which the fluid flows and which the hydraulic cylinder 70 moves. The pressure relief valve 86 is a safety valve operable when the pressure into the cylinder 70 through line 82 becomes sufficiently high that it could cause damage to the auger 16, the hydraulic cylinder 70, or other parts of the post hole digger 10. The pressure relief valve 86 is preferably adjustable and is set so the cylinder 70 can be operated at a maximum rate to move the auger 16 as fast downward as it will properly dig, yet it is set to relieve the pressure on the cylinder 70 should the auger 16 be stopped in vertical movement of slowed such that it or the cylinder 70 or auger bit 92 might be damaged. When the pressure relief valve 86 opens, hydraulic fluid flows from line 82 directly into line 80 through a relief line 88.

In operation of the post hole digger 10, the tractor operator starts the auger 16 rotating then starts the auger 16 in downward movement by opening a control valve that passes fluid into line 82. The auger 16 moves downward at the predetermined rate as set at the flow control valve 84. The operator must watch the auger 16 move downward and when the transverse member 64 reaches the stops 52, he reverses the control valve, redirecting the fluid flow and withdrawing the auger from the earth.

The guide and fence pusher 56 is used to align the auger bit 92 by sight an using its vertical side members 60. The guide can easily be used to judge the vertical angle of the auger bit 92 by aligning it between the vertical members 60. Also, the guide 56 can be used to judge an angular position of the auger bit. The guide 56 is placed behind the auger 16 and extended rearward from the auger frame 21, so it can be used to push back a fence, guideline or whatever so the auger bit 92 will be in a proper position aligned with the fence or a line of post holes.

In the manufacture of the post hole digger 10 of this invention, it is obvious the frame structure 14 is easily constructed from standard form materials and with normal manufacturing techniques. The hydraulic system and auger 16 are substantially all commercially available components used with this invention.

In the use and operation of the post hole digger 10 of this invention, it is seen that same provides a post hole digger that is adapted for mounting on and use with a conventional tractor. The post hole digger 10 is adapted for drilling holes vertically or at an angle and adapted for use on level terrain or uneven terrain. The post hole digger is adjustable in the vertical rate of motion of the auger 16 and means to protect its hydraulic operating system and auger bit 92 from damage.

As will be apparent from the foregoing description of the applicant's post hole digger structure, relatively inexpensive means have been provided to readily dig holes in the earth vertically or at an angle whether or not the operating tractor is on level ground or not. The post hole digger id adapted for use with a conventional type tractor vehicle and is easily installed thereon, easily used and has means to protect itself against damage.

While the invention has been described in conjunction with preferred specific embodiments thereof, it will be understood that this description is intended to illustrate and not limit the scope of the invention, which is defined by the following claims.

I claim:

1. A tractor-mountable post hole digger means comprising:
   a. frame means mountable with the hitch means of a tractor vehicle, said frame means having upright spaced side members and a support member transverse thereof and mounted thereon in slidable relation thereto,
   b. auger means pivotally mounted on said transverse support member of said frame means, and positionable generally vertically irrespective the position of said frame means, c. adjustable means to maintain said auger means in desired position relative said frame means,
d. means to raise and lower said auger means, and
e. auger means rotating means connected to said auger means and connectable to the powering means of the tractor vehicle.

2. The tractor mounted post hole digger means as described in claim 1, wherein:
   a. said frame means has a mount means to attach same to the hitch means of a tractor vehicle,
   b. said auger means vertical moving means has means to control the vertical rate of motion of said auger means, and
   c. said auger means rotating means has means to connect same for operation to the power take-off of the tractor vehicle.

3. The tractor mounted post hole digger means as described in claim 2, wherein:
   a. said adjustable means to maintain said auger means in desired position relative said frame means is a bar member pivotally mounted with said auger means and securable to said frame means to hold said auger means in a fixed position, and
   b. said auger means vertical moving means has a hydraulic cylinder means mounted with said frame means and a lever means attached said hydraulic cylinder means and attached to said transverse member to move said transverse member up and down.

4. The tractor mounted post hole digger means as described in claim 3, wherein:
   a. said auger means has an elongated earth digging screw,
   b. said auger means rotating means has a gearbox means secured to said screw to rotate same,
   c. said means to connect said auger rotating means to the tractor power take-off is a shaft means attached said gearbox means and attachable to the power take-off of the tractor.

5. The tractor mounted post hold digger means as described in claim 4, wherein:
   a. said means to control the vertical rate of motion of said auger means is a flow control valve connected to said hydraulic cylinder means to control the rate of extension and retraction thereof, and
   b. said hydraulic cylinder means has a pressure relief valve connected thereto to release excessive fluid pressure from said hydraulic cylinder when same is subjected to excessive forces.

6. The tractor mounted post hole digger means as described in claim 5, wherein:
   a. said flow control valve is an adjustable valve so as to provide the desired rate of vertical motion of said auger means, and
   b. said pressure relief valve is an adjustable valve so as to provide the desired degree of protection to the structure of said post hole digger means.

* * * * *